US011325263B2

(12) United States Patent
Chen et al.

(10) Patent No.: US 11,325,263 B2
(45) Date of Patent: May 10, 2022

(54) SYSTEM AND METHOD FOR REAL-TIME ROBOTIC CONTROL (71) Applicant: Teradyne, Inc., North Reading, MA (US)

(72) Inventors: Xi Chen, Lexington, MA (US); Douglas E. Barker, Watertown, MA (US)

(73) Assignee: Teradyne, Inc., North Reading, MA (US)

( * ) Notice: Subject to any disclaimer, the term of this patent is extended or adjusted under 35 U.S.C. 154(b) by 467 days.

(21) Appl. No.: 16/023,962

(22) Filed: Jun. 29, 2018

(65) Prior Publication Data
US 2020/0001471 A1 Jan. 2, 2020

(51) Int. Cl.
B25J 13/08 (2006.01)
B25J 9/16 (2006.01)

(52) U.S. Cl.
CPC .......... *B25J 13/081* (2013.01); *B25J 9/1689* (2013.01)

(58) Field of Classification Search
CPC .................................. B25J 13/08; B25J 9/16
See application file for complete search history.

(56) References Cited

U.S. PATENT DOCUMENTS

| | | | |
|---|---|---|---|
| 5,915,253 A * | 6/1999 | Christiansen | G06F 16/289 |
| 6,757,587 B1 | 6/2004 | English et al. | |
| 6,944,584 B1 * | 9/2005 | Tenney | B25J 9/1671 700/17 |
| 7,680,300 B2 | 3/2010 | Chang et al. | |
| 7,853,356 B2 * | 12/2010 | Tsai | B25J 9/1602 700/245 |
| 8,301,421 B2 | 10/2012 | Bacon et al. | |
| 8,408,918 B2 | 4/2013 | Hu et al. | |
| 8,428,781 B2 | 4/2013 | Chang et al. | |
| 9,357,708 B2 | 6/2016 | Chang et al. | |
| 2002/0193909 A1 * | 12/2002 | Parker | G05B 19/4182 700/259 |
| 2003/0171846 A1 * | 9/2003 | Murray, IV | G06N 3/008 700/245 |
| 2008/0065243 A1 * | 3/2008 | Fallman | G05B 19/409 700/83 |
| 2011/0153297 A1 * | 6/2011 | Keibel | A61N 5/1043 703/7 |
| 2013/0001209 A1 * | 1/2013 | Hirota | B23K 9/1062 219/130.01 |
| 2013/0103192 A1 * | 4/2013 | Huettenhofer | B25J 9/162 700/245 |
| 2015/0199458 A1 | 7/2015 | Bacon et al. | |
| 2015/0290807 A1 * | 10/2015 | Paleologue | B25J 9/1656 700/257 |
| 2016/0039090 A1 * | 2/2016 | Oyamada | B25J 9/163 700/253 |

(Continued)

*Primary Examiner* — Kira Nguyen
(74) *Attorney, Agent, or Firm* — Mark H. Whittenberger, Esq.; Holland and Knight LLP (57) ABSTRACT Embodiments included herein are directed towards a system and method for robotic control. The system may include a graphical user interface configured to allow a user to access a data storage unit associated with a robot. The system may further include a configurable portion including the data storage unit, a manipulator controller, and a data transfer layer. The system may also include a generic portion configured to parse the configurable portion to generate a robotic controller.

18 Claims, 7 Drawing Sheets

(56) References Cited

U.S. PATENT DOCUMENTS

2016/0321381 A1   11/2016  English et al.
2017/0120441 A1*  5/2017  Guerin .................. B25J 9/1671
2017/0364076 A1* 12/2017  Keshmiri ................ G05D 1/02
2018/0060459 A1    3/2018  English et al.
2018/0281187 A1* 10/2018  Lee ..................... G05B 19/042

* cited by examiner

SYSTEM AND METHOD FOR REAL-TIME ROBOTIC CONTROL

TECHNICAL FIELD

The present disclosure generally relates to robotics and more specifically to generating a robotic control system in real-time.

BACKGROUND

As robots become more and more prevalent in today's society having an appropriate control system for each robot becomes increasingly important. For example, many robotic applications require different robotic hardware, however, this hardware generally does not come with a specified controller for a particular application or task. The amount of time required to write and create these control programs is both costly and time-intensive.

Robot controllers generally require inter-process communication layers. These layers may enable communication with hardware components such as sensors and servo-drives and software components such as safety processes, GUI processes, other robot controllers, etc. Robot controllers also generally require state machines that may be configured to model both system level events and robot level events, such as control mode events (e.g., position control, velocity control, assistive mode, etc.) and component level events (e.g., enable/disable servos).

Some of the difficulties in developing new robotic controllers include creating the state machines to handle all of the required events properly, connecting all of the hardware inputs and outputs to the state machine, as well as handling the events and processing/transferring of data safely in various threads and processes.

SUMMARY

In one or more embodiments of the present disclosure, a robotic control system is provided. The system may include a graphical user interface configured to allow a user to access a data storage unit associated with a robot. The system may further include a configurable portion including the data storage unit, a manipulator controller, and a data transfer layer. The system may also include a generic portion configured to parse the configurable portion to generate a robotic controller.

One or more of the following features may be included. In some embodiments, the configurable portion may further include a hardware communication layer in communication with at least one robot. The graphical user interface may be configured to allow a user to access the data store. The graphical user interface may be configured to allow a user to customize the manipulator controller, a thread and a hardware communication layer. The manipulator controller may be configured to synchronize one or more states between a plurality of controllers using the data store. The hardware communication layer may be selected from the group consisting of EtherCAT, PROFINET, and real-time data exchange ("RTDE"). The data transfer layer may be configured to allow communication between the graphical user interface and the plurality of controllers. The data storage unit may include a thread safe data pool configured to store one or more GUI commands, one or more joint states, or one or more hardware states. The graphical user interface may utilize a mark-up language to allow the user to customize the manipulator controller and the hardware communication layer. The manipulator controller may include a state machine. The hardware communication layer may determine a communication protocol to use, one or more actuators or sensors to use, and one or more parameters associated with the one or more actuators or sensors. The thread may determine when the hardware communication layer and the manipulator controller run. The graphical user interface may be configured to allow a user to generate the configurable portion. The graphical user interface may be configured to allow a user, via a markup language, to reconfigure at least a subportion of the configurable portion.

In another embodiment of the present disclosure, a robotic control method is provided. The method may include allowing, using a graphical user interface, a user to access a data storage unit associated with a robot. The method may further include providing a configurable portion including the data storage unit, a manipulator controller, and a data transfer layer. The method may also include parsing, using a generic portion, the configurable portion to generate a robotic controller.

One or more of the following features may be included. In some embodiments, the configurable portion further includes a hardware communication layer in communication with at least one robot. The graphical user interface may be configured to allow a user to access the data store. The graphical user interface may be configured to allow a user to customize the manipulator controller, a thread and a hardware communication layer. The manipulator controller may be configured to synchronize one or more states between a plurality of controllers using the data store. The hardware communication layer may be selected from the group consisting of EtherCAT, PROFINET, and real-time data exchange ("RTDE"). The data transfer layer may be configured to allow communication between the graphical user interface and the plurality of controllers.

BRIEF DESCRIPTION OF THE DRAWINGS

For a better understanding of the nature and objects of the present disclosure, reference is made to the following detailed description taken in conjunction with the following drawings, in which.

DETAILED DESCRIPTION

Embodiments included herein are directed towards a system and method for robotic control. More specifically, the teachings of the present disclosure may allow for the generation of a real-time robotic controller. The system may include a graphical user interface ("GUI") configured to allow a user to access a data storage unit associated with a robot. The system may further include a configurable portion including the data storage unit, a manipulator controller, and a data transfer layer. The system may also include a generic portion configured to parse the configurable portion to generate a robotic controller.

Embodiments of the subject application may include concepts from U.S. Pat. Nos. 6,757,587, 7,680,300, 8,301,421, 8,408,918, 8,428,781, 9,357,708, U.S. Publication No. 2015/0199458, U.S. Publication No. 2016/0321381, and U.S. Publication No. 2018/0060459, the entire contents of each are incorporated herein by reference in their entirety.

It should be noted that components or modules described herein may be configurable (e.g. Extensible Markup Language (XML) configurable, etc.). Accordingly, changes to a controller may not require the rebuilding of executable files. This may hold true even in the situation of dynamic linking. The modular and reusable configuration included herein may allow for a new robot controller to be quickly written. While many of the embodiments included herein may discuss the use of markup language (for example, "XML" files), these are intended to be non-limiting examples. Accordingly, any programming language (e.g., JavaScript Object Notation "JSON") or script language (e.g., Python) may be used without departing from the teachings of the present disclosure.

Embodiments included herein may provide a real-time operating system ("RTOS") executable (real-time controller), a description (e.g. XML) that describes the controller, and a language (e.g., Qt Modeling Language ("QML")) that describes the GUI. Embodiments included herein may also provide a GUI that may be used to generate the XML and QML GUI.

Figure 1:
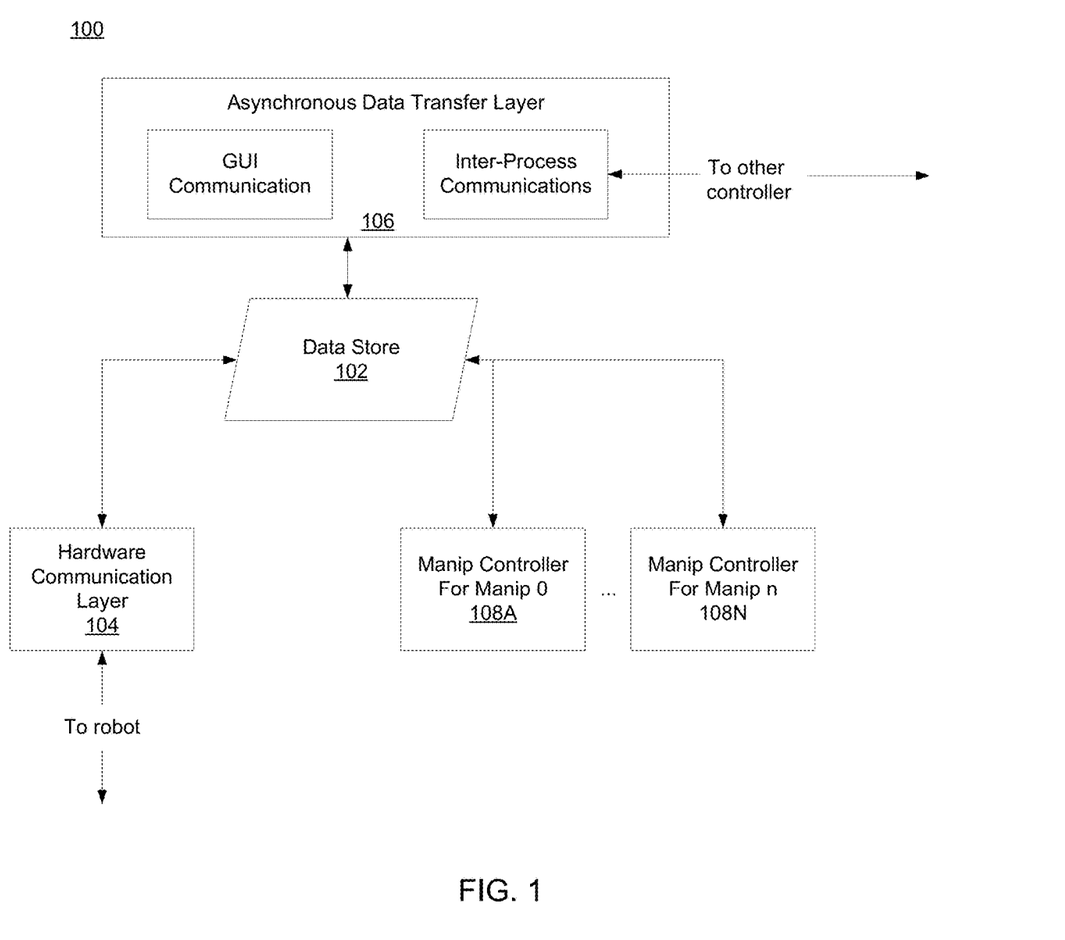
FIG. 1 is a block diagram of a robotic control system, according to an embodiment of the present disclosure.
Figure 2:
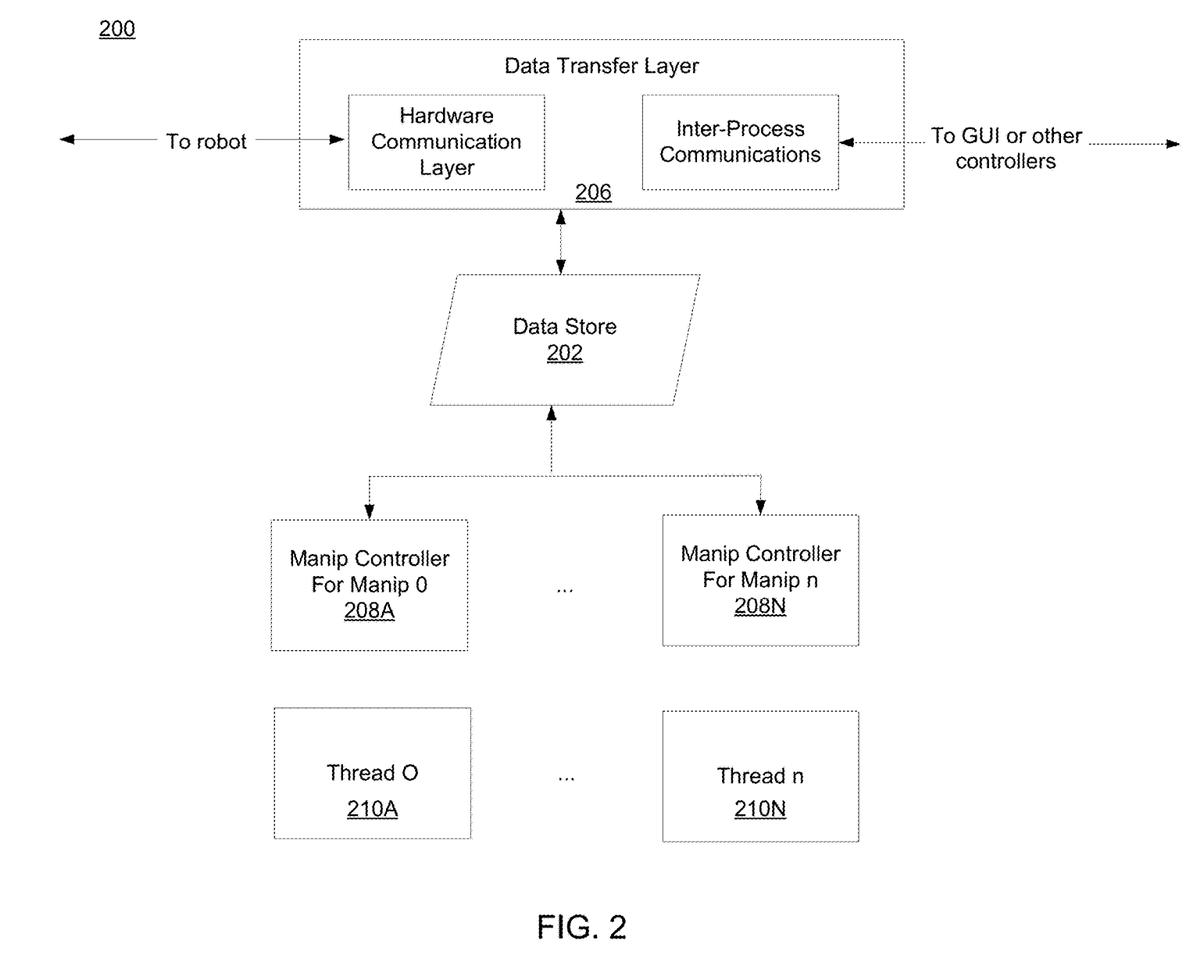
FIG. 2 is a block diagram of a robotic control system, according to another embodiment of the present disclosure.

Referring now to FIGS. 1-2, embodiments showing robotic control systems 100, 200 consistent with the teachings of the present disclosure are provided. Robotic control system 100 may include a data storage unit or store 102, a hardware communications layer 104, an asynchronous data transfer layer 106, one or more manipulator controllers 108, and one or more threads 210. Each of these is discussed in further detail hereinbelow.

In some embodiments, data store 102 may include a thread safe data pool. The term "thread safe", as used herein, may refer to an implementation guaranteed to be free of race conditions when accessed by multiple threads simultaneously. A race condition is the behavior of a software system where the output is dependent on the sequence or timing of other uncontrollable events. It becomes a bug when events do not happen in the order the programmer intended. The thread safe configuration may make it possible to have any number of threads without having to be concerned about thread safety. Data store 102 may be configured to store any suitable type of data. Some data types may include, but are not limited to, commands from a graphical user interface, command states, hardware states, joint states, etc. All objects may subscribe and/or publish data. As used herein, to "publish" may refer to declaring a piece of storage in the data store and linking the two, which may be handled by the class on the provider side. As used herein, to "subscribe" may refer to linking to an existing piece of storage in the data store, which may be handled by the class on the receiver side. For example, manipulator controllers 108 may publish command joint positions. This behavior may be hard coded and in some cases the state machine may only set data. All objects behavior may react to the data.

In some embodiments, data store 102 may be configured to hold some or all of the data the robotic control process needs to share between objects. Data maps in the data store may be scoped by key and value types. Some of the data in data store 102 may be templated and can hold any key or value type. Data Stores may be nested and accessed using predefined paths. These concepts are discussed in further detail hereinbelow.

In some embodiments, data store 102 may include a data access layer that may be configured to manage access to data in data store 102. The data access layer may be used to add, access, and/or modify elements in data store 102. The data access layer may be configured to create accessors to elements that provide lookup-free access to obtain and/or set values. The data access layer may manage thread safety and may be easily derived for new platform specific implementations. Accordingly, data store 102 (and its data) may only be modified through the data access layer. The data access layer may ensure thread safe data element access using the one or more accessors.

In some embodiments, hardware communications layer 104 may allow for communication between data store 102 and one or more robots. As such, hardware communication layer 104 may be configured as a data transfer layer. Some examples of hardware communications layer 104 may include, but are not limited to, EtherCAT, PROFINET, Real-Time Data Exchange ("RTDE"), etc. An EtherCAT layer, by way of example, may consist of one or more slaves. Each slave may define a mapping between process data objects ("PDO") and server data objects ("SDO") and data store elements. This may include publishing hardware states, actual position, torque, etc., as well subscribing slave commands, target position, torque, etc. Each slave may also define callbacks for initializing, enabling, disabling, and/or resetting as necessary. The system may be configured to support any suitable slave (e.g. servos, digital IO, etc.). In some embodiments, callbacks may be called by a manipulator controller state machine. In this way, the hardware communications layer may send out SYNC events to trigger a controller update. Additionally and/or alternatively, an XML, file may define an EtherCAT slave mapping to manipulator joints and data store elements. With regard to cyclic updating, each slave may read its receiver ("Rx") PDO and write its transmitter ("Tx") PDO. The cyclic update may be called by a real-time thread at a fixed rate.

Figure 3:
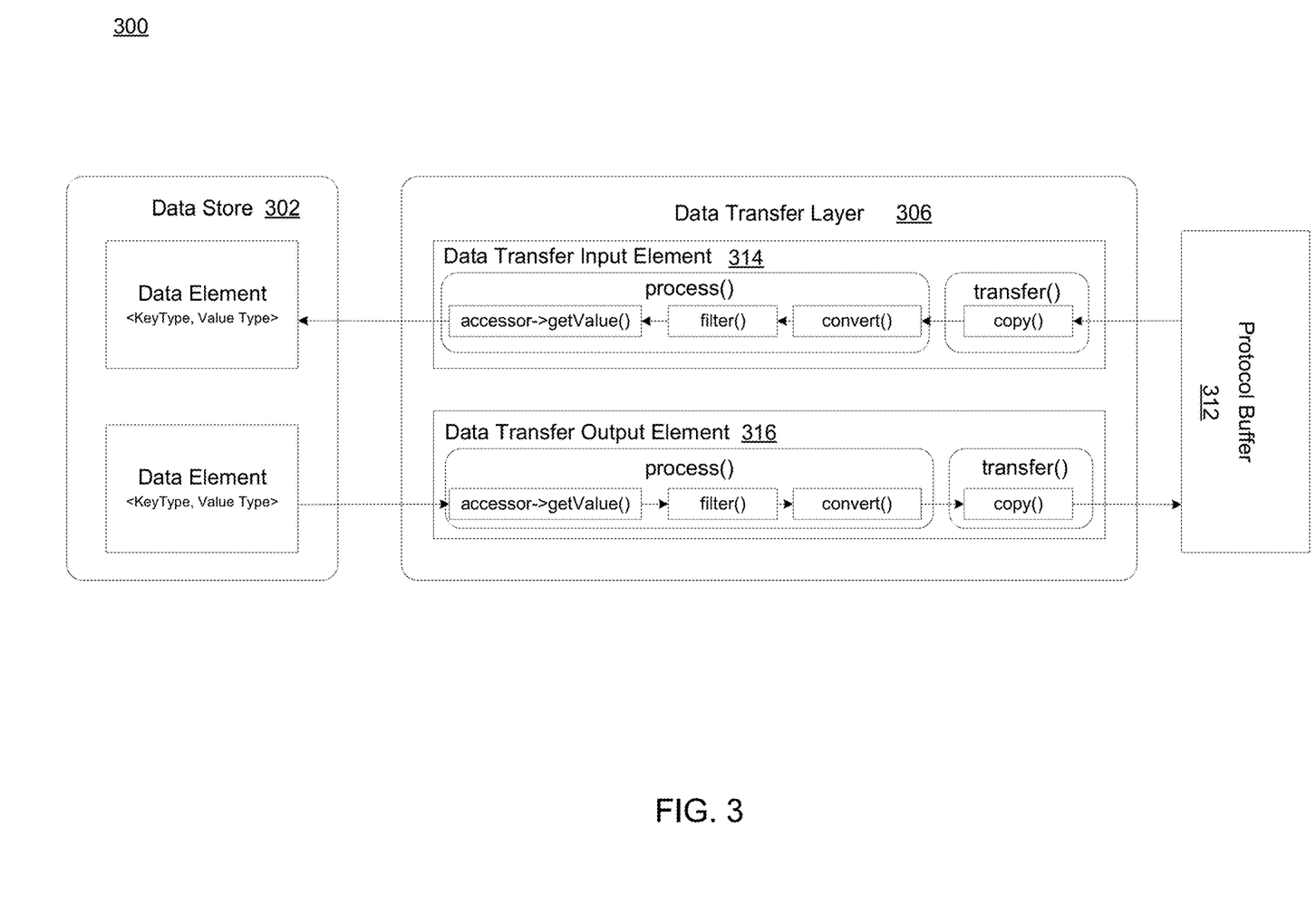
FIG. 3 is a block diagram of a data transfer layer, according to an embodiment of the present disclosure.

In some embodiments, and referring also to FIG. 3, a diagram depicting an example asynchronous data transfer layer 306 is provided. Asynchronous data transfer layer 306 may be configured to perform inter-process communication. Some examples may include shared memory, data distribution service ("DDS"), etc. In operation, asynchronous data transfer layer 306 may be used to communicate with a graphical user interface and/or manipulator controllers 108. Data transfer layer 306 may be configured to manage data transfer and processing into and out of data store 302 via an external data source (e.g., marshalling data from protocol buffers 312 to the target data store 302). Each data transfer layer may include sets of input and output data transfer element vectors 314 and 316 respectively. Accordingly, each data transfer element may map a key-value pair in data store 302 to some external data source (e.g., EtherCAT process image, shared memory segment, etc.), convert the data type (e.g., buffered type to/from data store element type) and filter the data (e.g., units conversion, calibration scale/offset, low-pass filter, etc.) on transfer. The data transfer elements 314, 316 may perform index mapping (e.g., manipulator joint index mapping, etc.) and use the data store element accessor to set or obtain the value in the data store 302.

In some embodiments, and referring again to FIGS. 1-2, manipulator controllers 108 may be included for each manipulator, which may be configured to control one or more robots. Accordingly, each manipulator controller 108 may include a control executive (e.g. those available from the Actin group of products, which are available from the Assignee of the present disclosure), a modifier, one or more state machines, and/or callbacks.

In some embodiments, each manipulator controller 108 may include a state machine called by a thread and a list of control tasks called by the state machine. The state machine may comply with any suitable standard, including, but not limited to, State Chart XML ("SCXML"), etc. The state machine may define an initial state and/or a list of states wherein each state may include a list of transitions and an optional action. Each transition may define an event (e.g. a test of true or false), an action (e.g. call callbacks), and/or a target (e.g. target state). Each transition may respond to data in the data store and/or invoke callbacks on exit. Some control tasks may include, but are not limited to, control input (e.g. status word, etc.), callbacks (e.g., Inverse Kinematics ("IK"), run EcScript, collaborative tool, etc), control output (e.g., control word, command joint position, etc.). Control tasks may be called by state machine or threads. It should be noted that states may be synced between manipulator controllers.

Figure 4:
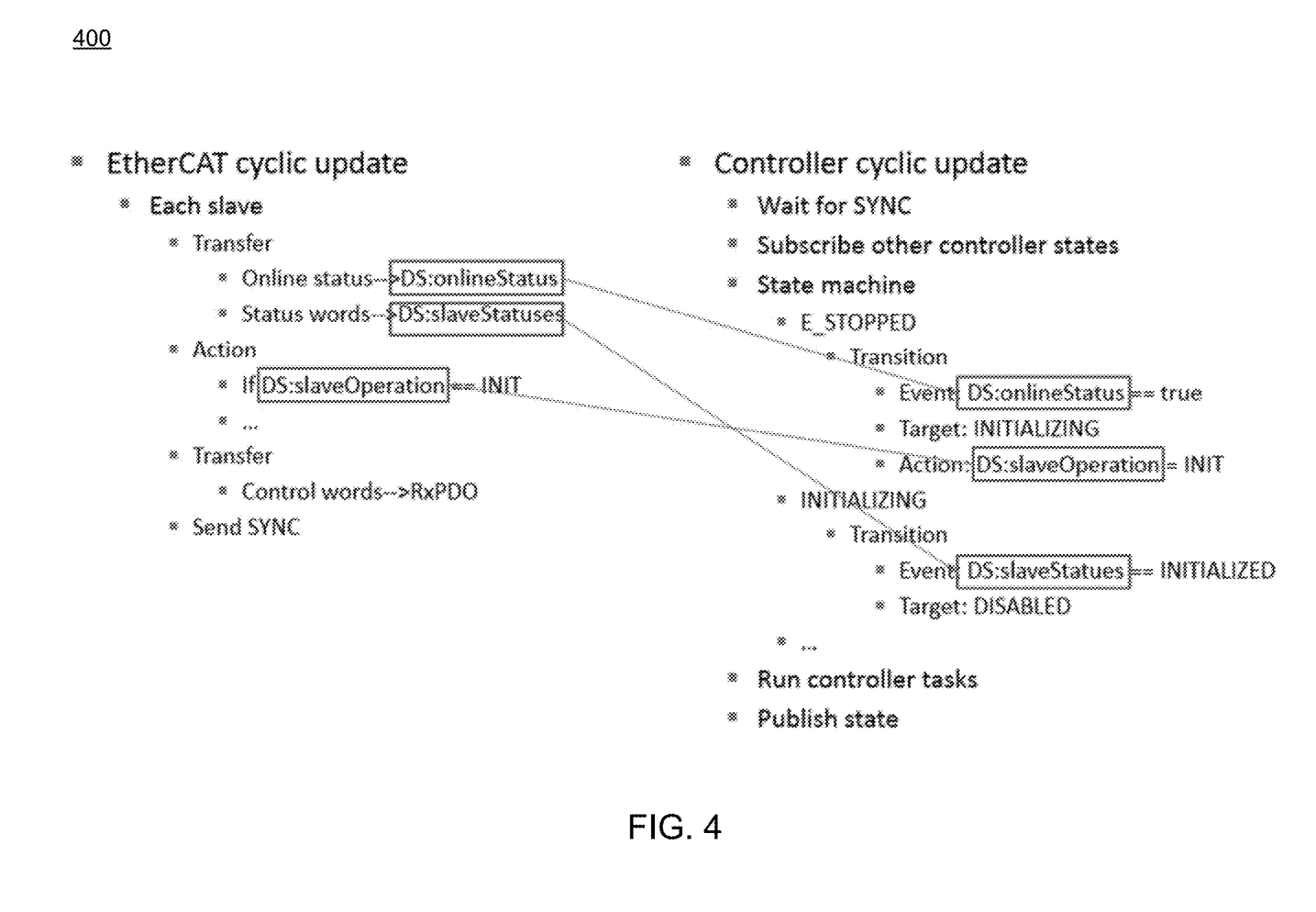
FIG. 4 is a diagram showing an example cyclic update of a robotic control process, according to an embodiment of the present disclosure.

In some embodiments, each manipulator controller 108 may be configured to specify a manipulator label, publish the commanded state of its manipulator and/or subscribe to the states of the other manipulators. Publishing the commanded state of the manipulator may include identifying the target position. Subscribing the states of the other manipulators may include identifying the actual position of itself published by the EtherCAT layer and/or identifying the target position of other manipulators for syncing states. In the event that multiple manipulators need to be controlled a list of manipulator controllers may be accessed. Each controller may be called by one thread (e.g. multi-to-one) and each thread may be assigned a CPU core (e.g., multi-to-one) thus providing for a more flexible system. With regard to cyclic updating, manipulator controller 108 may wait for SYNC updates, subscribe data if new data is available, run the state machine, run controller tasks, publish data, etc. FIG. 4 shows an example cyclic update consistent with embodiments of the present disclosure.

In some embodiments, one or more threads 210 may be configured to run various other modules. As discussed above, the data used may be thread safe and the individual threads may have different update rates, dependencies, and/or priorities. Any number of threads 210 may be used and threads 210 may be accessible via a shared memory layer. In some embodiments, threads may be explicitly defined in a language such as WL. Callbacks may be retrieved from data store 202 and called serially.

In some embodiments, threads 210 may include one or more of timed threads, event threads, and/or callback invokes. A timed thread may run at fixed or configurable rates and may send out synchronization events. An event thread may run when an event is received. A thread may invoke any callback and all callbacks associated with the system may eventually be run by the threads. For example, a state may invoke callbacks. Callbacks may also be run during a state machine update, which is also a form of callback. The state machine update may be invoked by a thread.

Figure 5:
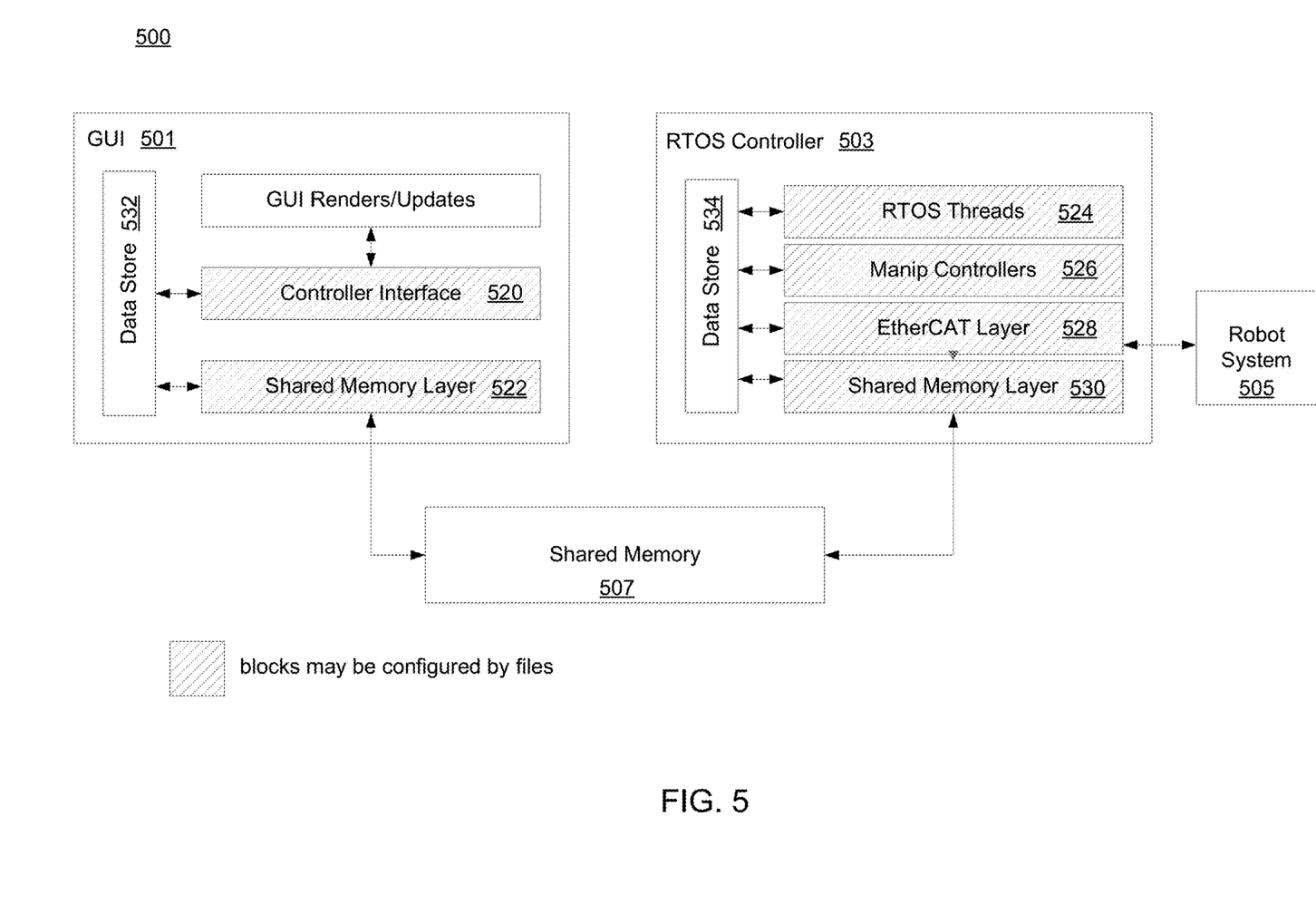
FIG. 5 is a block diagram of a robotic control system, according to an embodiment of the present disclosure.

Referring now to FIG. 5, another embodiment of a robot control system consistent with the present disclosure is provided. This embodiment includes two main parts, namely, GUI 501 and RTOS controller 503. GUI 501 may be configured to show the states of the controller and the robots to the user. GUI 501 may also send user commands to controller 504. Controller 503 may be configured to communicate with both the GUI 501 and one or more robots or robot systems 505, and makes control decisions based on the information it obtains as well as its own states. The communication between the GUI 501 and controller 503 may be performed through shared memory 507, and that between controller 503 and robot system 505 may be performed through EtherCAT, for example.

In some embodiments, and as shown in FIG. 5, there may be substructures inside GUI 501 and the controller 503. Accordingly, the controller interface 520, shared memory layer 522, RTOS threads 524, manipulator controllers 526, EtherCAT layer 528, and/or shared memory layer 530 may all be configurable.

In some embodiments, and as discussed above, data store may function as a table which may in some cases require key type, value type, element ID, element path to access the value. Usually, the element key may be a string, so the key type may be a string. The value type and value may depend on the particular object that is stored. The element path performs like the path of a file, and there may be different elements with the same element ID but a different element path. Data store elements are usually published and updated by one block, and subscribed by another block for further use. In the header file, the element's key type and value type may be declared, so we still need the element ID and the element path, and these missing pieces may be provided by the configuration file. In this way, the class member may be related with an element in data store. Prior to using this data store element, it may need to be published or subscribed to actually link the class member with a piece of storage in data store.

In some embodiments, a data store element may be published before being subscribed. An initial-configure mechanism is configured to address this issue. All publish functions may be called in the initial method, while all subscribe functions may be called in the configure method. The system may first call these initialization methods hierarchically, so that all storage in the data store are declared; and then call the configuration methods, so that all data store element linkage are established. After this initialize-configure mechanism, the interface configuration process finally completes, and the other functions of the software start to run.

In some embodiments, the configurability of embodiments of robot control system 500 may provide the ability to initialize a class instance with XML configuration files. This may provide the same program with the ability to act differently after loading different configuration files.

In some embodiments, a controller interface file (e.g. XML) 520 may configure a class object for GUI 501. In each GUI update cycle, this controller interface 520 may transfer data between GUI 501 and GUI data store.

In operation, in some embodiments, an interface configuration process may initiate where a plugin reads in a configuration file. Then, this function may initialize controller interface 520 with the content of the XML file. The connection between a member of the class and a block of the XML file may be established by the matches between tokens and tag names. Each configurable class member of controller interface 520 may be registered with a token. And in the configuration file, the tag names may be exactly the same as the tokens. In this way, robotic control system 500 knows which class member this tag block is for. This configuration technique may be hierarchical, meaning class members may be further configured with nested tag blocks or attributes, such as the arm interface.

As discussed above, numerous aspects of the robotic control system 500 may be configurable. For example, controller interface 520 may include a number of configurable members. Some of these may include, but are not limited to, "send callback" which may refer to a callback that transfers data from data store to shared memory layer, originally published by the GUI shared memory layer, "receive callback", which may refer to a callback that transfers data from shared memory layer to data store, originally published by the GUI shared memory layer, "controller heartbeat", which may refer to a running time of the RTOS controller, indicating the aliveness of the controller, originally published by the RTOS controller, "manipulator system state", which may refer to a position/velocity/acceleration state of the robot system, originally published by the RTOS controller, "propagation results", which may refer to one or more exception states of the robot system, originally published by the RTOS controller, "GUI heartbeat", which may refer to a running time of the GUI, indicating the aliveness of the GUI.

In some embodiments, robotic control system 500 may include one or more configurable arm interfaces. Some of these may include, but are not limited to, "manipulator label", which may refer to the name of the robot arm this interface relates to, "state machine state", which may refer to the current state of the arm's state machine, originally published by manipulator controller of the arm, "estimated torques", which may refer to an estimated torque of the arm, originally published by manipulator controller of the arm, "operation request", which may refer to a state transition command for the arm's state machine, originally published by the controller interface, a "motion script", which may refer to a motion script for the arm, originally published by the controller interface, a "motion script counter", which may refer to a counter of the motion scripts sent, indicating the script is new, originally published by the controller interface, and/or one or more "Jogging inputs", which may refer to data related to jogging. Jogging may refer to the process of manually positioning one or more axes of a robot.

In some embodiments, robotic control system 500 may include one or more configurable jogging interfaces. Some of these may include, but are not limited to, "current placement", which may refer to a current placement of the active end effector set, originally published by manipulator controller, "current velocity", which may refer to a current velocity of the active end effector set, originally published by manipulator controller, "desired placement", which may refer to a target placement of the active end effector set, originally published by manipulator controller, a "desired velocity", which may refer to a target velocity of the active end effector set, originally published by manipulator controller, a "control mode", which may refer to a control mode of the arm, originally published by manipulator controller, a "constraint set", which may refer to an active end effector set, originally published by manipulator controller, an "input state counter", which may refer to a counter for the jogging inputs, indicating a new group of data, originally published by manipulator controller.

In some embodiments, robotic control system 500 may include one or more configurable SHCD interfaces. Some of these may include, but are not limited to, "manipulator label", which may refer to a name of the SHCD this interface relates to, and "SHCD Grip Value", which may refer to a raw grip value of SHCD, originally published by EtherCAT layer.

In some embodiments, an RTOS controller file (e.g. XML) may configure a class object for the RTOS controller application 503. The application may set up the RTOS environment for the system controller. Controller 503 may be configured to communicate with the GUI 501 and robot system 505 through data transfer layers, while calls may control one or more algorithms through manipulator controllers. RTOS controller 503 may adopt the same or similar techniques as controller interface 520.

In some embodiments, robot control system 500 may include a control executive file name. This file may include the system control executive ('sce' in the file name) of the robot system. Through this file, RTOS controller 503 knows the mechanic/dynamic/control information about the robot system 505, so this file may need to match the real robot system to be controlled. It should be noted that the system controller and the manipulator controllers 526 may each have their own system control executive, and these sce's may be configured to communicate with each other only through data store. Some files may be "simplified" and labeled as such, meaning this file only contains a simplified geometry of the robot system 505. Although a system control executive with full geometry also works for controller 503, a simplified geometry is strongly recommended, because this greatly accelerates the loading process, and there is no rendering in controller 503.

In some embodiments, robotic control system 500 described herein may include a control task vector, which may be configure a series of predefined control tasks. A control task may consist of three parts: control inputs, control outputs and the control body. The control inputs/outputs transfer data from/to data store, and, as such, may be referred to as transfer elements. When a control task is called, the control inputs execute first, the control body then, and the control outputs last. Control tasks may be published to the data store as callbacks, so all control tasks may include at least two attributes, which may correspond to element paths and element IDs of data store elements. Transfer elements may also have at least two attributes, pointing to the data store elements they transfer. The transfer elements that transfer data store elements for a certain manipulator may also specify the manipulator with an attribute, while those that transfer data store elements for the system may not need this attribute.

In some embodiments, control tasks may be used by both system controller 503 and the manipulator controllers 526. Control tasks used by manipulator controllers 526 (e.g., type 1 control tasks), are the majority of the control tasks. They may be based on a control executive modifier and/or a wrapper class for system control executive. In contrast, control tasks used by the system controller 503 (e.g., type 2 control tasks) may be configured to gather data of each manipulator to a local variable, and then put this local variable back to data store. There are two kinds of data that need to be collected: the manipulator system state and the propagation result data vector.

In some embodiments, the collect manipulator system state task may hold a manipulator system state object. All of its control inputs obtain states from each manipulator through data store 102, and put them into this object. Its control output then transfers this object to the data store. The control body may be empty. Some example transfer elements (having both a tag and subsequent description) for the collect manipulator system state task may include, but are not limited to, gathering joint positions (e.g., obtain joint positions of a manipulator from data store), gather individual manipulator system state (e.g., obtain position/velocity state of a manipulator from data store, dispense manipulator system state (e.g., set local manipulator system state to data store), etc.

In some embodiments, the collect propagation result data vector task may hold a propagation result data vector object. In this way, all of its control inputs may obtain propagation result data from each manipulator 526 through data store, and put them into this object. Its control output then transfers this object to data store. Again, the control body may be empty. Some example transfer elements (having both a tag and subsequent description) for the collect propagation result data vector task may include, but are not limited to, gather propagation result data (e.g., obtain propagation result data of a manipulator from data store), dispense propagation result vector (e.g., set local propagation result data vector to data store), etc.

In some embodiments, threads may call callbacks published by different components periodically, and keep the robotic control system 500 running. Embodiments of the present disclosure may utilize multiple thread types, including, but not limited to, timed threads and event threads. A timed thread may count RTOS ticks and fires events. Some configurable features associated with a timed thread may include, but are not limited to, setting the cycle time of the time thread update (e.g., in one timed thread update, each event's update may be called once), configuring the events, setting the fire rate of the event (e.g., the event may be fired every frequency divider number of update calls), the element ID of this event, the CPU this thread is assigned to, a base element path for all timed thread items, an element ID of the callback that starts timed thread, the size of the stack assigned to this thread, the priority of this thread. A timed thread start callback may specify the callback that starts the timed thread. In contrast, an event thread may be configured to call a series of invokes in order, when a certain event happens. Some configurable features associated with an event thread may include, but are not limited to, an event this thread waits for, an element path of the event, an element ID of the event, a time out for the waiting, configuring the invokes, an element ID of the invoke, an element path of the invoke, the CPU this thread is assigned to, a base element path for all timed thread items, an element ID of the callback that starts timed thread, a size of the stack assigned to this thread, and/or a priority of this thread, etc.

In some embodiments, and with respect to threading operation, a time step corresponding to the duration between adjacent ticks may be provided and/or set. This member may inform the real-time OS the duration between adjacent ticks. Since all threads work upon ticks, this may set the highest frequency a function can be called.

In some embodiments, an EtherCAT layer file (e.g., XML) 528 may be used to set up the connection between the system 503 and manipulator controllers 526 and the robot system 505. For each EtherCAT device, this file may include, but is not limited to, communication information of EtherCAT devices, e.g., slaves (this information may establish two-way connection between controller application 503 and robot system 505), control information of slaves (this information may convert slave data between device format (e.g. encoder counts) and control format (e.g. radians)), and/or data store information that may configure data store elements for slave states. The EtherCAT layer 528 may include one or more configurable members, some of which may include, but are not limited to, update cycle time, license key, a name of the file that contains EtherCAT network information for robot system 505, the mac address of the EtherCAT, a callback to start the cyclic update, and/or configuration data for EtherCAT slave devices.

In some embodiments, each slave device may include its own 'element' block inside the a larger configuration data block. In each 'element' block, there may be a 'key' block defining name of the element, and a block specifying the type of the slave and related information. All of the 'key's may be different. In the EtherCAT network, each slave device may have a unique address. There may also be a 'slaveAddress' attribute in each slave configuration block. They must be match. A digital 10 slave may be used to obtain digital input from an input device and set digital output to output device. Some configurable features associated with an IO slave may include, but are not limited to, a base element path for all data store elements in this block, a slave address of this device, should match the EtherCAT network information ("ENI") file, the ability to configure the related data store element for digital input, the element key of the data store element, the element path of the data store element, the number of channels/bits of the digital input, an ability to configure the related data store element for digital output, the element key of the data store element, the element path of the data store element, and/or the number of channels/bits of the digital output.

In some embodiments, an SHCD slave may be used to obtain SHCD device states, and may publish them to data store. Some configurable features associated with a SHCD slave may include, but are not limited to, the angles of the SHCD joints in radians, the status of connection, and/or the raw grip value. In some embodiments, one robot arm may include multiple slaves. From the view the EtherCAT layer 528, each slave has its own control callbacks; while from the view of the manipulator controller 526, the states and commands of the manipulator should be one element, not several fragments In this way, the control callbacks may be at a first path, while the control states/commands may be at the a second path. Some examples of callbacks that may be associated with a particular slave may include, but are not limited to, initialize the actual/command joint positions to the slave's current position, initialize the slave device, torque on, position control mode, torque off, check fault status, clear fault status, torque on, torque control mode, and/or emergency stop. Some examples of control states/commands that may be associated with a particular slave may include, but are not limited to, position commands for joints, torque commands for joints, control words for joints, actual positions of joints, actual currents of joints, and/or status words of joints.

In some embodiments, the blocks inside a particular slave block may be used to configure control parameters of the slave. A joint index block, for example, may map slave axes to joints in the controller. Some of the others may define the conversion between EtherCAT device data format (counts) and the controller data format (e.g., radians). The device may send data of axes in the same order; all first numbers relate to the first axis, and all second numbers relate to the second axis. For example, the joint index block means the first axis of the device is joint 1 and the second axis is joint 0. Some configurable control parameters of a slave may include, but are not limited to, number of counts/1 round of motor, a gear ratio such as motor rotation/joint rotation, the count reading when the joint is consider at 0, the polarity of the motor current, the constant used to convert command torque to current count. The relations between the control states (e.g., joint position, joint current, joint torque, position count, current count) and these control parameters are as below:

$$\text{Joint position (rad)} = -\frac{2\pi * (\text{position count} - \text{Joint offset})}{\text{Counts per revolution} * \text{Gear ratio}}$$

$$\text{Joint current (A)} = \text{Current polarity} * \text{Current count}/449$$

$$\text{Joint torque (Nm)} = \text{Joint current} * \text{Torque constant}$$

In some embodiments, shared memory layers 522 and 530 may be used by both the GUI and the RTOS controller to communicate with the shared memory 507. These two shared memory layers may share the same mechanism. An RTOS controller shared memory layer file (e.g., XML) may include an entire configuration file for the controller shared memory layer 530. This shared memory layer may 530 include multiple files as its major parts. Some attributes may include, the base element base for elements in this block, the name of the shared memory segment, and/or the flag of resetting the segment when first connected (e.g., '1' means reset, '0' means don't reset).

In some embodiments, a data store elements block 534 may be configured to declare elements in the data store directly. All elements transferred through shared memory 507 may be declared, so that these elements exist before the transfer actually occurs. These elements may act as placeholders to prevent the system from crashing during system initialization.

In some embodiments, a shared memory segment block may be configured to declare segments in the shared memory 507. For easy understanding and management, the shared memory segments may be divided into groups by their sources and destinations. The shared memory segment tag name may indicate the key type and value type of the segment. The inside 'key' block may refer to the name of the shared memory segment, 'maxByte' may refer to the space the shared memory segment acquires, and 'value' may refer to the initial value. To locate a shared memory segment one or more of the following may be required: group name, segment key, segment key type, segment value type, etc.

In some embodiments, a data transfer configuration file may configure the transfers between data store and shared memory 507. Each shared memory segment may correspond to an individual transfer element. Accordingly, it may divide shared memory input/output elements into groups, the same way as their corresponding shared memory segments. A group may include a first shared memory input element. This element corresponds to the first shared memory segment. The group 'key' may be the same as the corresponding shared memory segment for easy understanding. The group may also include multiple containers for the elements, which may be named from the point of the data store, meaning input/output to/from data store. In order to achieve the transfer, a shared memory input/output element has to know the data store element, the shared memory segment and the transfer direction.

In some embodiments, robotic control system 500 may utilize a GUI shared memory layer 522. Accordingly, a GUI shared memory layer configuration file may be used. This may be similar to the RTOS controller shared memory layer 530. A data transfer configuration file may be used to keep the system efficient and concise. As such, every shared memory input/output element at the controller side 503 should have a corresponding transfer element at the GUI side 501, and vice versa. Otherwise, there could be shared memory segments that may be updated but not requested, or shared memory segments that may be requested but not updated.

In some embodiments, a manipulator controller file (e.g., XML) may be used as part of the robotic control system. This file may be configured to define the behavior of a manipulator (arm). It may include two major parts: control tasks and a finite state machine. The control tasks may define several actions, while the finite state machine may define the logic of the system. A manipulator label may tell the manipulator what it relates to. A data store elements block 534 may define several data store elements; some of them may be placeholders used in controller simulation, and others are control parameters for some control tasks.

In some embodiments, manipulator controller 526 may utilize a control task vector. The control tasks used by manipulator controllers 526 may all be Type 1 control tasks. They also have multiple parts some of which may include, but are not limited to, control inputs, control outputs and control body. These parts work upon the system executive modifier. The control inputs set data to the modifier, the control outputs get data from the modifier, and the control body call modifier functions to perform the requisite function. Each Type 1 control task may include at least two attributes, for example, 'path' and 'updateCallbackId'. The 'path' may define the element path of the task's update callback data store element, and the 'updateCallbackId' may define the element ID of the update callback element. Some control tasks may include, but are not limited to, inverse kinematics to calculate and update the state of the system, data synchronization that may call the transfer elements to move the data (e.g., if the counter key is empty, ignore the counter; otherwise, increment the counter in each update), run predefined motion script, which may run the a defined motion script (e.g., if the user wishes to run the predefined motion script multiple times, the restart callback has to be called before the next calls of the update callback), and/or run a motion script sent from GUI, which may run the motion script sent from GUI. Different motion script counters may indicate that the scripts are new. A check torque divergence control task may collect new samples of actual joint positions and actual joint currents. Then, based on the filtering parameters and time steps, the estimated joint torques and sensed joint torques are calculated. If the collision flag is already ON, this task may return the flag directly. Otherwise, the task may do collision checking based on the torque divergence of estimated joint torques and sensed joint torques. If the difference exceeds the collision stop threshold, the task may set the collision flag. And, finally the collision flag may be returned anyway. Call reset flag callback to reset the collision flag. Other control tasks may include, generating an assistive mode torque command, which may generate the torque commands for torque control in the assistive/teach mode (the mechanism may be the same as the check torque divergence task, other than this task has a larger collision stop threshold), and/or the reset manipulator velocity to reset the system velocity state to zero.

In some embodiments, the control task vector may also include one or more transfer elements. Some manipulator level Type 1 transfer elements may include, but are not limited to, obtaining position state, setting position state, setting sensed position state, obtaining joint positions, setting joint positions, setting sensed joint positions, obtaining velocity state, setting joint velocities, obtaining active end effector set index, obtaining current control mode, obtaining actual placement of the end effector set, obtaining actual velocity of the end effector set, obtaining desired placement of the end effector set, obtaining desired velocity of the end effector set, obtaining manipulator system state, setting states of a manipulator to manipulator system state, obtaining propagation result data, and/or setting propagation result data. Some system level Type 1 transfer elements may include, obtaining digital output from the board, setting digital input to the board, obtaining manipulator system state, obtaining propagation results data vector, etc.

In some embodiments, and as discussed above, robotic control system 500 may utilize one or more state machines. Based on the conditions of the system components, the state machines may call invokes and transit between states. States, transitions, conditions and invokes are the primary components of the state machine. The state machine may include several states. The 'initial' attribute may define the initial state of the state machine. The 'path' and 'id' attributes may define the state machine's update callback in the data store. The state machine may always call the update of the current state. A state may include several transitions and invokes. The state calls transition updates in listed order. If one of the transitions happens, the following transition updates may be skipped. If none of the transitions happens, the invokes may be called. A transition contains several conditions and invokes. The 'target' defines the target state if this transition happens. The transition calls the conditions in listed order. If one of the conditions fails, the following conditions may be skipped, and the transition does not happen. If all the conditions meet, the invokes may be called and the transition happens. A condition may include multiple attributes. For example, 'elementId' and 'elementPath' may define the related data store element, and the 'condValue' may define the value to which the data store element compares. If the data store element equals the condition value, the condition meets. Otherwise, the condition fails. For different data store element value types, different condition tags may be used. Some example conditions may include 'condBoolean' comparing a bool element with the condition value, 'condString' comparing a string element with the condition value, and 'condFunction' calling a callback and comparing its return value with the condition value. Invokes are callback elements in the data store. The 'taskId' and 'taskPath' may refer to the element ID and element path for the related callback data store element. Usually, the invokes may be the control tasks defined earlier or the slave functions defined in the EtherCAT layer.

As discussed above, in some embodiments, manipulator controller 108 may be configured to perform a number of controller tasks. Some of these may include, but are not limited to, inverse kinematics, collision detection, free drive, as well as numerous others.

In some embodiments, for an inverse kinematics task, the system may monitor the condition (e.g. state==ENABLED||SIMULATION) and take the appropriate action (e.g. run motion script and call modifier::calculateState). An inverse kinematics task may take desired position as input and calculates joint positions and velocities that can reach the desired position.

The target position may be published. A control input may be used to sense the position state of other manipulators and a control output may be used to set the position and velocity state of this manipulator. The system may be updated using applyMotion and calculateState updates. In some embodiments, motion commands may be separated from an IK task. When enabled the system may subscribe to the motion script, subscribe the state, and publish the state.

Additionally and/or alternatively, for a collision detection task, the system may again monitor any changes in the state (e.g. ENABLED), publish the collision status, and subscribe the manipulator state. A collision detection task may to check if a robot is in collision with itself or another robot. Here, the system may run inverse dynamics and signal when unexpected torque is detected. For a free drive task, the system may monitor for changes in the state (e.g. FREE DRIVE) and then perform gravity and/or friction compensation and then publish the target torque. A free drive task may calculates joint torques to compensate for gravity and friction so that a human operator can move the robot by hand.

In some embodiments, the manipulator controller may operate in an assistive mode. Here, the system may be configured to run inverse dynamics and compute gravity and friction compensation. The target torque may be published.

In some embodiments, the system may be configured to subscribe a motion script, which may be from a shared memory layer, from user datagram protocol ("UDP"), etc. A local script may be run for a customized application. In operation, digital input may be transferred from the data store to a data map and then the task may be defined.

In some embodiments, a GUI may be configured to allow for selection of a motion script from memory. Accordingly, the GUI may allow for the sending, clearing, reading, and/or updating of a script.

In some embodiments, the robotic control system included herein may operate in conjunction with one or more GUIs. Accordingly, a user may load a simulation using one of these GUIs and then generate a real-time controller description XML as well as generating a QML. The GUI may be configured to provide one or more panels or windows for backend types including, but not limited to, real vector, position state, end effector placement, etc. A generic real-time controller, description XML, system control executive XML and ENI may be provided. Spread hardware configuration to the description XML. Accordingly, the control system of the present disclosure may be configured to obviate the need for sending system control executive through shared memory as the GUI may be configured to generates it.

Figure 6:
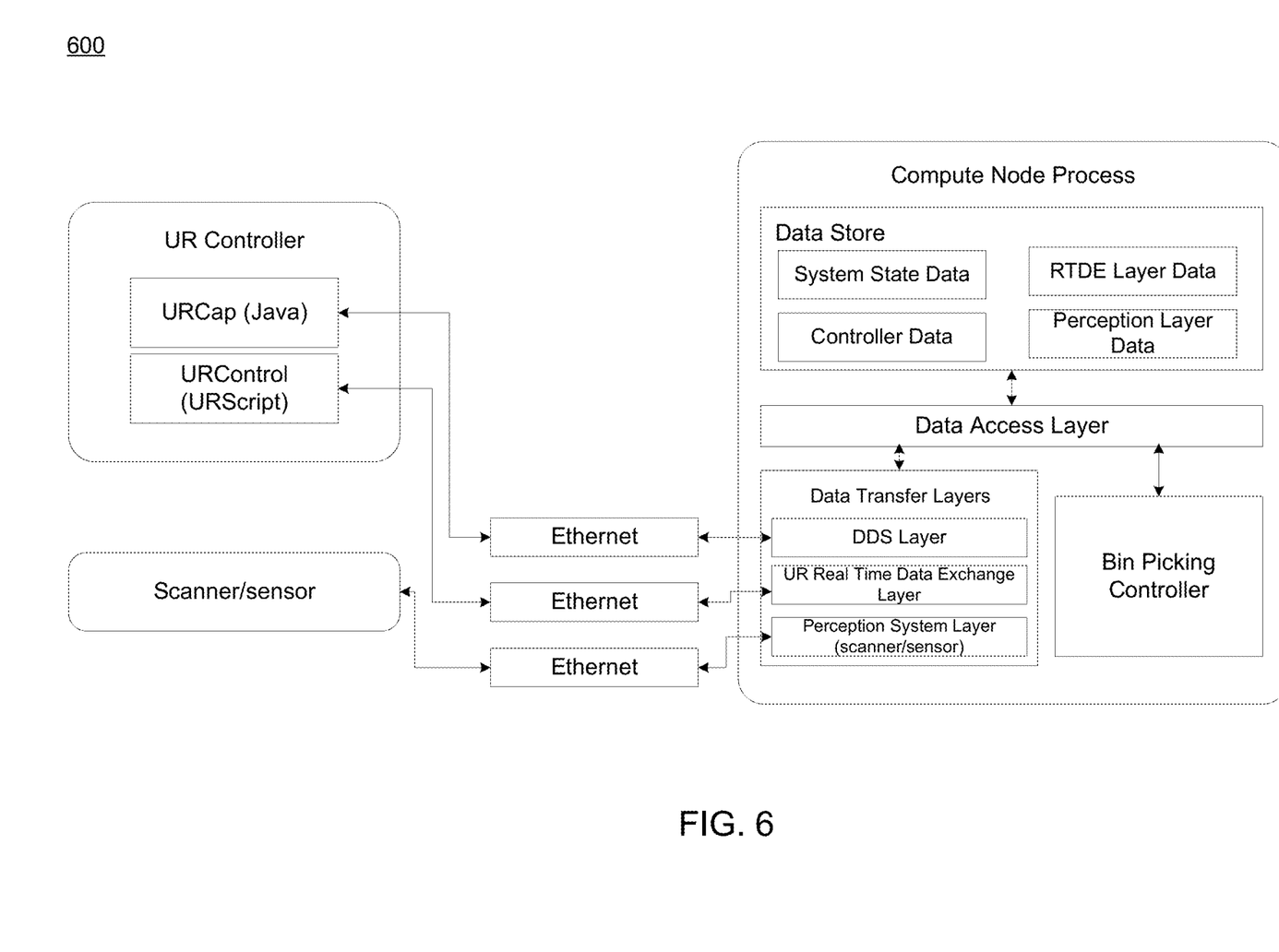
FIG. 6 is a block diagram of a robotic control system as used in a bin picking application, according to an embodiment of the present disclosure.

In some embodiments, systems and methods described herein may include general components that may be reused to build robot controllers for numerous different types of applications. For example, the teachings of the present disclosure may be used in bin picking applications such as those provided in FIG. 6. These applications are provided merely by way of example and are not intended to limit the scope of the present disclosure.

In some embodiments, systems and methods described herein may enable easy definition and reuse of robot state machines, states, transitions, guards, etc. Binaries for a collaborative robot controller state machine may be usable to control any hardware that provides the required feature set (e.g., position control, torque control, current/torque sensing, etc.). Components from one state machine may be reusable in another state machine (e.g., enabled and disabled states). The system may be able to define system specific parameters, constants, variables, and conversions generally in an appropriate language such as XML, for example. The architecture may support the general creation of hardware config files without needing to write new code. The system may be able to set one or more manipulator joints (e.g., Actin) to hardware servo mapping and conversions from XML. The system may also be able to configure inter process data transfer (e.g., EtherCAT, DDS, Shared Memory, etc.) using a common interface in XML. Shared memory segments, EtherCAT process image structures and/or access variables may be defined in XML. (e.g., no hard coded structs to define data buffers).

In some embodiments, the control system may be configured to provide a general interface for a manipulator system hardware controller. Accordingly, the system may allow for easy configuration of both system and subsystem level state machines. The system may implement standard state chart concepts and descriptions while providing an easy to use interface for implementing new manipulator hardware controllers.

In some embodiments, the control system may provide a general interface to application data. Accordingly, the general interface may be configured to enable XML configuration of application data (e.g., constants and variables) without code modification. The general interface may allow for the creation of a flexible data storage container which may include any runtime process data (e.g., joint positions commands, desired end-effector position, etc.) along with system specific constants (e.g., license keys, port identifiers, etc.). The data storage container may be platform independent and portable.

In some embodiments, the control system may provide safe and efficient access to application data. Accordingly, data storage may be accessible to other objects running in the process. Access to the data in high frequency run-time methods may be direct (e.g., no lookup or parsing). Access to the data may be thread safe and provide the ability to lock element mutexes individually and by group. The system may be easy to port to a new platform.

In some embodiments, the control system may provide a common interface for inter process communication for data transfer. Accordingly data transfer layers (e.g., EtherCAT, shared memory, DDS, etc.) may be implementations of a common interface. The common interface may be configured to support mapping of manipulator joints (e.g. Actin, etc.) to individual servos through the hardware data transfer layer. The common interface may support the transfer of data from hardware layers to the application data store (e.g., Actin, etc.) through filters that handle units conversion, calibration scaling/offsets, and any user defined filter. The common interface may support type conversion and be flexible to accommodate different serialization implementations.

Figure 7:
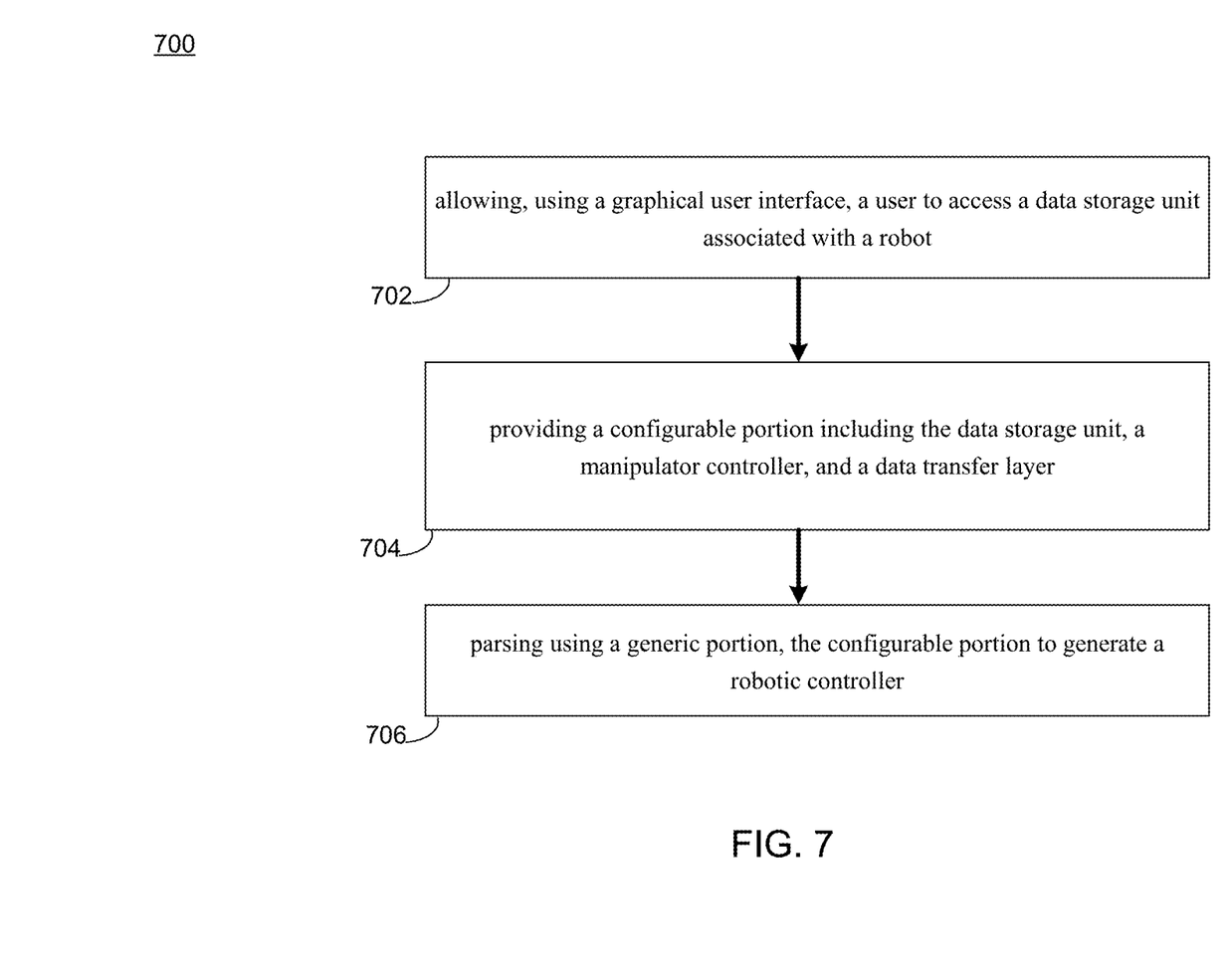
FIG. 7 is a flowchart of a robotic control process, according to an embodiment of the present disclosure.

Referring now to FIG. 7, a flowchart including operations consistent with a robotic control process are provided. Operations may include allowing (702), using a graphical user interface, a user to access a data storage unit associated with a robot. Operations may also include providing (704) a configurable portion including the data storage unit, a manipulator controller, and a data transfer layer. Operations may further include parsing (706), using a generic portion, the configurable portion to generate a robotic controller.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may, but not always, represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A robotic control system comprising:
a configurable real-time robotic controller portion including a data storage unit, a manipulator controller, a hardware communication layer in communication with at least one robot and a data transfer layer, wherein each of the manipulator controller and the hardware communication layer include one or more configurable members that are configured using one or more configuration files linking the one or more configurable members to portions of the one or more configuration files; and
a graphical user interface including a configurable controller interface, wherein the graphical user interface is configured to allow a user to access the data storage unit of the configurable real-time robotic controller portion, wherein the configurable controller interface is in communication with the configurable real-time robotic controller portion through the data transfer layer, wherein the graphical user interface is further configured to allow a user to communicate with at least one of the manipulator controller, the hardware communication layer, and a thread, wherein the thread determines when the hardware communication layer and the manipulator controller run.

2. The robotic control system of claim 1, wherein the graphical user interface is configured to allow a user to access the data store.

3. The robotic control system of claim 2, wherein the graphical user interface utilizes a mark-up language to allow the user to configure the manipulator controller and the hardware communication layer.

4. The robotic control system of claim 1, wherein the manipulator controller is configured to synchronize one or more states between a plurality of controllers using the data store.

5. The robotic control system of claim 4, wherein the data transfer layer is configured to allow communication between the graphical user interface and the plurality of controllers.

6. The robotic control system of claim 1, wherein the hardware communication layer is selected from the group consisting of EtherCAT, PROFINET, and real-time data exchange ("RTDE").

7. The robotic control system of claim 1, wherein the data storage unit includes a thread safe data pool configured to store one or more GUI commands, one or more joint states, or one or more hardware states.

8. The robotic control system of claim 1, wherein the manipulator controller includes a state machine.

9. The robotic control system of claim 1, wherein the hardware communication layer determines a communication protocol to use, one or more actuators or sensors to use, and one or more parameters associated with the one or more actuators or sensors.

10. The robotic control system of claim 1, wherein the graphical user interface is configured to allow a user, via a markup language, to reconfigure at least a subportion of the real-time robotic controller configurable portion.

11. A method for configuring a real-time robotic controller, comprising:
provid­ing a real-time robotic controller configurable portion including a data storage unit, a manipulator controller, a hardware communication layer in communication with at least one robot and a data transfer layer;
configuring at least one of the manipulator controller and the hardware communication layer using one or more configuration files associated with at least one of the manipulator controller and the hardware communication layer, wherein each of the manipulator controller and the hardware communication layer include one or more configurable members that are configured using one or more configuration files linking the one or more configurable members to portions of the one or more configuration files;
allowing, via the graphical user interface, a user to access the data storage unit of the configurable real-time robotic controller portion, wherein the configurable controller interface is in communication with the configurable real-time robotic controller portion through the data transfer layer; and
allowing, via the graphical user interface, the user to communicate with the manipulator controller, the hardware communication layer, and a thread, wherein the thread determines when the hardware communication layer and the manipulator controller run.

12. The robotic control method of claim 11, wherein the graphical user interface is configured to allow a user to access the data store.

13. The robotic control method of claim 11, wherein the manipulator controller is configured to synchronize one or more states between a plurality of controllers using the data store.

14. The robotic control method of claim 13, wherein the data transfer layer is configured to allow communication between the graphical user interface and the plurality of controllers.

15. The robotic control method of claim 11, wherein the hardware communication layer is selected from the group consisting of EtherCAT, PROFINET, and real-time data exchange ("RTDE").

16. The robotic control system of claim 1, wherein the controller interface is configured to initialize a class object in the data storage unit for the graphical user interface.

17. A robotic control system comprising:
a configurable real-time robotic controller portion including a data storage unit, a manipulator controller, a hardware communication layer in communication with at least one robot and a data transfer layer, wherein each of the manipulator controller and the hardware communication layer include one or more configurable members that are configured using one or more Extensible Markup Language (XML) configuration files linking the one or more configurable members to portions of the one or more XML configuration files; and
a graphical user interface including a configurable controller interface, wherein the graphical user interface is configured to allow a user to access the data storage unit of the configurable real-time robotic controller portion, wherein the configurable controller interface is in communication with the configurable real-time robotic controller portion through the data transfer layer, wherein the graphical user interface is further configured to allow a user to communicate with at least one of the manipulator controller, the hardware communication layer, and a thread, wherein the thread determines when the hardware communication layer and the manipulator controller run.

18. The robotic control system of claim 17, wherein the linking between the one or more configurable members to portions of the one or more XML, configuration files is established by matching one or more tokens within the one or more XML configuration files with one or more tag names associated the one or more configurable members.

* * * * *